(12) United States Patent
Liu

(10) Patent No.: US 10,315,407 B2
(45) Date of Patent: Jun. 11, 2019

(54) ENVIRONMENTAL WOOD LAMINATE FLOORING AND METHOD FOR FORMING THE SAME

(71) Applicant: Zhejiang Lingge Wood Co., Ltd, Zhejiang (CN)

(72) Inventor: Binbin Liu, Hunan (CN)

(73) Assignee: Zhejiang Lingge Wood Co., Ltd, Zhejiang (CN)

( * ) Notice: Subject to any disclaimer, the term of this patent is extended or adjusted under 35 U.S.C. 154(b) by 22 days.

(21) Appl. No.: 15/232,173

(22) Filed: Aug. 9, 2016

(65) Prior Publication Data

US 2016/0348379 A1 Dec. 1, 2016

Related U.S. Application Data

(63) Continuation-in-part of application No. 13/634,400, filed as application No. PCT/CN2011/076744 on Jul. 1, 2011, now Pat. No. 9,434,147.

(30) Foreign Application Priority Data

Jul. 1, 2010 (CN) .......................... 2010 1 0215063

(51) Int. Cl.
| | |
|---|---|
| *B32B 3/10* | (2006.01) |
| *B32B 38/14* | (2006.01) |
| *B32B 21/06* | (2006.01) |
| *B32B 21/14* | (2006.01) |
| *B32B 37/18* | (2006.01) |
| *E04F 15/04* | (2006.01) |

(Continued)

(52) U.S. Cl.
CPC ............... *B32B 38/14* (2013.01); *B27N 1/00* (2013.01); *B32B 3/06* (2013.01); *B32B 5/02* (2013.01); *B32B 21/02* (2013.01); *B32B 21/06* (2013.01); *B32B 21/14* (2013.01); *B32B 29/02* (2013.01); *B32B 37/18* (2013.01); *E04F 15/042* (2013.01); *B32B 2260/028* (2013.01); *B32B 2260/046* (2013.01); *B32B 2264/102* (2013.01); *B32B 2307/404* (2013.01); *B32B 2307/4026* (2013.01); *B32B 2307/414* (2013.01); *B32B 2307/554* (2013.01); *B32B 2307/72* (2013.01); *B32B 2307/732* (2013.01); *B32B 2317/125* (2013.01); *B32B 2317/16* (2013.01); *B32B 2419/04* (2013.01)

(58) Field of Classification Search
None
See application file for complete search history.

(56) References Cited

U.S. PATENT DOCUMENTS

| | | | |
|---|---|---|---|
| 5,465,511 A | 11/1995 | O'Dell et al. | |
| 6,667,108 B2 * | 12/2003 | Ellstrom | B32B 21/14 |
| | | | 156/228 |

(Continued)

*Primary Examiner* — Christopher M Polley
(74) *Attorney, Agent, or Firm* — Ohlandt, Greeley, Ruggiero & Perle, LLP

(57) ABSTRACT

A novel environmental wood laminate flooring and a method for forming the same are provided. The flooring includes a base board layer and a stacked structure adhered to a top surface of the base board layer, wherein the stacked structure comprises a wear-resistant layer, a wood veneer layer and a layer of glue-soaked paper which are stacked successively from top to bottom, and wherein the layer of glue-soaked paper is dip-dyed with different shades of colors.

15 Claims, 1 Drawing Sheet

(51) Int. Cl.
  *B27N 1/00*    (2006.01)
  *B32B 5/02*    (2006.01)
  *B32B 21/02*   (2006.01)
  *B32B 29/02*   (2006.01)
  *B32B 3/06*    (2006.01)

(56) References Cited

U.S. PATENT DOCUMENTS

| | | |
|---|---|---|
| 7,732,057 B2 | 6/2010 | Stokes et al. |
| 2002/0100231 A1 | 8/2002 | Miller et al. |
| 2005/0186440 A1* | 8/2005 | Hausmann ............... B32B 27/08 |
| | | 428/515 |
| 2006/0064940 A1* | 3/2006 | Cappelle ............ A47G 27/0293 |
| | | 52/589.1 |
| 2007/0251030 A1 | 11/2007 | Oberholzer |
| 2008/0017307 A1 | 1/2008 | Ong et al. |
| 2008/0268273 A1* | 10/2008 | O'Brien ................... B27D 1/00 |
| | | 428/528 |
| 2011/0138722 A1* | 6/2011 | Hannig ................... E04F 15/02 |
| | | 52/309.1 |

\* cited by examiner

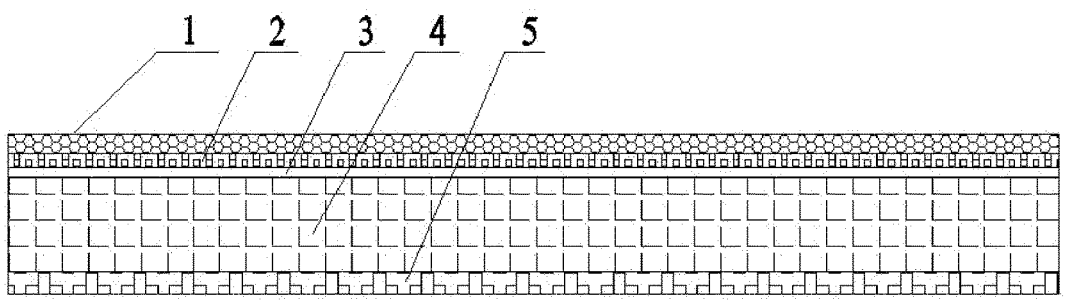

ENVIRONMENTAL WOOD LAMINATE FLOORING AND METHOD FOR FORMING THE SAME

CROSS REFERENCE TO RELATED APPLICATIONS

The present application is a continuation-in-part application of U.S. patent application Ser. No. 13/634,400, filed Sep. 12, 2012, and claims the priority of Chinese Patent Application No. 201010215063.0, filed on Jul. 1, 2010.

FIELD OF THE DISCLOSURE

The present disclosure generally relates to the field of flooring, and more particularly, to a novel environmental wood laminate flooring and a method for forming the same.

BACKGROUND OF THE DISCLOSURE

With the living standards rising, more people prefer to live in an environment in close touch with nature, such as buildings in decoration with a real natural beauty. Therefore, solid wood flooring is popular in ground decoration, which dramatically reduces forest resources in the earth, negatively influences the ecological balance, and further destroys the living environment of mankind. Besides, floorings made of solid wood have disadvantages like easy deformation, poor wear-resistance and complexity in installation processes where keel splints are needed. Nowadays, there are many kinds of laminate floorings in the market. However, these laminate floorings lack natural texture of the solid wood.

BRIEF SUMMARY OF THE DISCLOSURE

One aspect of the present disclosure is to provide a novel environmental wood laminate flooring.

The novel environmental wood laminate flooring may include a base board layer and a stacked structure adhered to a top surface of the base board layer, wherein the stacked structure may include a wear-resistant layer, a wood veneer layer and a layer of glue-soaked paper which are stacked successively from top to bottom, and wherein the layer of glue-soaked paper may be dip-dyed with different shades of colors.

Optionally, the layer of glue-soaked paper may be dip-dyed into yellow or light green.

Optionally, the layer of glue-soaked paper may include raw paper and glue, the raw paper of the layer of glue-soaked paper may have a basis weight of 90 g and in the layer of glue-socked paper, a weight of the glue may be 50% to 130% of the raw paper's weight.

Optionally, the wood veneer layer may be translucent.

Optionally, the wear-resistant layer may include a first wear-resistant layer and a second wear-resistant layer which are stacked successively from top to bottom.

Optionally, a composition of the first wear-resistant layer may be same with or different from that of the second wear-resistant layer.

Optionally, the first wear-resistant layer may include raw paper and resin, the raw paper in the first wear-resistant layer may have a basis weight of 33 g and in the first wear-resistant layer, a weight of the resin may be equal to or greater than 170% of the raw paper's weight; and wherein the second wear-resistant layer may include raw paper and resin, the raw paper in the second wear-resistant layer may have a basis weight of 33 g and in the second wear-resistant layer, a weight of the resin may be equal to or greater than 170% of the raw paper's weight.

Optionally, the first wear-resistant layer may include raw paper and resin, the raw paper in the first wear-resistant layer may have a basis weight of 40 g and in the first wear-resistant layer, a weight of the resin may be equal to or greater than 170% of the raw paper's weight; and wherein the second wear-resistant layer may include raw paper and resin, the raw paper in the second wear-resistant layer may have a basis weight of 20 g and in the second wear-resistant layer, a weight of the resin may be equal to or greater than 170% of the raw paper's weight.

Optionally, the second wear-resistant layer may be dyed with different shades of colors.

Optionally, the base board layer may be a high density board.

Optionally, the high density board may have a density ranging from 0.8 $g/cm^3$ to 0.85 $g/cm^3$.

Optionally, the base board layer may have a thickness ranging from 6 mm to 20 mm.

Optionally, the flooring may further include a balancing layer adhered to a bottom surface of the base board layer.

Optionally, the stacked structure may be adhered to the top surface of the base board layer via heat pressing process.

Optionally, the flooring may further include tongues and grooves, wherein the tongues and grooves may be configured on four lateral faces of the flooring, whereby a plurality of the floorings can be attached together via the tongues and grooves.

Another aspect of the present disclosure is to provide a method for forming a novel environmental wood laminate flooring.

The method may include: providing a base board layer; providing a wear resistant layer, a wood veneer layer and a layer of glue-soaked paper; dip-dyeing the layer of glue-soaked paper with different shades of colors; stacking the wear-resistant layer, the wood veneer layer and the layer of glue-soaked paper which is dip-dyed successively from top to bottom to form a stacked structure; and bonding the stacked structure and the base board layer together with the layer of glue-soaked paper of the stacked structure in contact with the base board layer.

Optionally, dip-dyeing the layer of glue-soaked paper with different shades of colors may include: dip-dyeing the layer of glue-soaked paper into yellow or light green.

Optionally, the wood veneer layer may be translucent.

Optionally, bonding the stacked structure and the base board layer together may include: performing, by heat pressing machine, a heat pressing to the stacked structure and the base board layer at a temperature ranging from 170° C. to 190° C. and under a pressure ranging from 16 MPa to 22 MPa, wherein the pressure is kept for a period from 20 seconds to 50 seconds.

Optionally, the heat pressing may be performed at a temperature of 175° C. under a pressure of 20 MPa, and the pressure may be kept for a period of 30 seconds.

Embodiments of the present disclosure have following advantages:

Manufacturing of the flooring asserts a simple process. The floorings manufactured by the embodiments are firm and durable as featured the laminate floorings and have the beauty and texture of solid wood flooring as well, which saves a lot of solid wood resources and beneficial for environment protection.

BRIEF DESCRIPTION OF THE DRAWINGS

FIG. 1 is a schematic cross-sectional view of a flooring formed by a method according to one embodiment of the present disclosure.

DETAILED DESCRIPTION OF THE DISCLOSURE

In order to clarify the technical features, characteristics, objects and advantages of the disclosure, exemplary embodiments of the disclosure will be interpreted in detail in combination with the accompanied drawing.

Exemplary Embodiment 1

Referring to FIG. 1, a method for forming a novel environmental wood laminate flooring includes processing steps as follows.

A wood veneer layer 2 is provided as a top layer of the flooring. A wear-resistance layer 1 is adhered on a top surface of the wood veneer layer 2, and a layer of glue-soaked paper 3 is pressed on a bottom surface of the wood veneer layer 2. The wood veneer layer 2 which is translucent has a thickness of about 0.1 mm. The glue-soaked paper 3 is dip-dyed into yellow. Beautiful and natural wood lines may be presented clearly due to a combining effect of the glue-soaked paper 3 and the wood veneer layer's natural wood texture. A fiberboard 4 is provided as a base board layer of the flooring. The fiberboard has a thickness of 12 mm, on a bottom surface of which a balancing layer 5 is stacked. The top layer and the base board layer formed above are stacked together and a heat pressing process is performed thereto with a heat pressing machine. The heat pressing process is performed at a temperature of about 175° C. and under a pressure of about 20 Mpa, and the pressure is kept for a period of about 30 seconds. Corresponding tongues and grooves are configured on four lateral faces of the flooring formed, so that a plurality of the floorings may be attached together with the corresponding tongues and grooves.

Exemplary Embodiment 2

Referring to FIG. 1, a method for forming a novel environmental wood laminate flooring includes processing steps as follows.

A wood veneer layer 2 is provided as a top layer of the flooring. A wear-resistance layer 1 is adhered on a top surface of the wood veneer layer 2, and a layer of glue-soaked paper 3 is pressed on a bottom surface of the wood veneer layer 2. The wood veneer layer 2 which is translucent has a thickness of about 0.2 mm. The glue-soaked paper 3 is dip-dyed into light green. Beautiful and natural wood lines may be presented clearly due to a combining effect of the glue-soaked paper 3 and the wood veneer layer's natural wood texture. A fiberboard 4 is provided as a base board layer of the flooring. The fiberboard has a thickness of 15 mm, on a bottom surface of which a balancing layer 5 is stacked. The top layer and the base board layer formed above are stacked together and a heat pressing process is performed thereto with a heat pressing machine. The heat pressing process is performed at a temperature of about 190° C. and under a pressure of about 22 Mpa, and the pressure is kept for a period of about 50 seconds. Corresponding tongues and grooves are configured on four lateral faces of the flooring formed, so that a plurality of the floorings may be attached together with the corresponding tongues and grooves.

Exemplary Embodiment 3

Referring to FIG. 1, a method for forming a novel environmental wood laminate flooring includes processing steps as follows.

A wood veneer layer 2 is provided as a top layer of the flooring. A wear-resistance layer 1 is adhered on a top surface of the wood veneer layer 2, and a layer of glue-soaked paper 3 is pressed on a bottom surface of the wood veneer layer 2. The wood veneer layer 2 which is translucent has a thickness of about 0.3 mm. The glue-soaked paper 3 is dip-dyed into light green. Beautiful and natural wood lines may be presented clearly due to a combining effect of the glue-soaked paper 3 and the wood veneer layer's natural wood texture. A fiberboard 4 is provided as a base board layer of the flooring. The fiberboard has a thickness of 15 mm, on a bottom surface of which a balancing layer 5 is stacked. The top layer and the base board layer formed above are stacked together and a heat pressing process is performed thereto with a heat pressing machine. The heat pressing process is performed at a temperature of about 170° C. and under a pressure of about 16 Mpa, and the pressure is kept for a period of about 20 seconds Corresponding tongues and grooves are configured on four lateral faces of the flooring formed, so that a plurality of the floorings may be attached together with the corresponding tongues and grooves.

Moreover, in some embodiments, the wear-resistant layer 1 may include two layers which are respectively a first wear-resistant layer (not shown in FIG. 1) and a second wear-resistant layer (not shown in FIG. 1). The first wear-resistant layer and the second wear-resistant layer are stacked successively from top to bottom.

In some embodiments, the first wear-resistant layer and the second wear-resistant layer may have a same composition. The first wear-resistant layer may include raw paper and resin, wherein the raw paper in the first wear-resistant layer may have a basis weight of 33 g, and a weight of the resin in the first wear-resistant layer may be equal to or greater than 170% of the raw paper's weight. The second wear-resistant layer may include raw paper and resin, wherein the raw paper in the second wear-resistant layer may have a basis weight of 33 g, and a weight of the resin in the second wear-resistant layer may be equal to or greater than 170% of the raw paper's weight. It should be noted that, the basis weight of the raw paper refers to a weight of the raw paper per square meter.

In some embodiments, the first wear-resistant layer and the second wear-resistant layer may have different compositions. The first wear-resistant layer may include raw paper and resin, wherein the raw paper in the first wear-resistant layer may have a basis weight of 40 g, and a weight of the resin in the first wear-resistant layer may be equal to or greater than 170% of the raw paper's weight. The second wear-resistant layer may include raw paper and resin, wherein the raw paper in the second wear-resistant layer may have a basis weight of 20 g, and a weight of the resin in the second wear-resistant layer may be equal to or greater than 170% of the raw paper's weight.

In some embodiments, the second wear-resistant layer may be dyed with different shades of colors.

In some embodiments, the wear-resistant layer 1 may include a layer of wear-resistant paper. The layer of wear-resistant paper may be dyed with different shads of colors. The layer of wear-resistant paper may include $Al_2O_3$.

In some embodiments, the wear-resistant layer 1 may further include wear-resistant agent, such as $Al_2O_3$.

In some embodiments, the wood veneer layer 2 may have a thickness of 0.2 mm.

In some embodiments, the layer of glue-soaked paper 3 may include raw paper and glue. The raw paper of the layer of glue-soaked paper 3 may have a basis weight of 90 g, and a weight of the glue being socked may be 50% to 130% of the raw paper's weight.

In some embodiments, the base board layer 4 may be a high density board that has a density ranging from 0.8 g/cm³ to 0.85 g/cm³.

In some embodiments, the balancing layer 5 may include raw paper and resin, wherein the raw paper in the balancing layer may have a basis weight of 120 g, and a weight of the resin in the balancing layer 5 may be equal to or greater than 110% of the raw paper's weight.

The principles, features and advantages of the present disclosure are illustrated and described above. It should be understood for those skilled in the art that the scope of the present disclosure should not be limited by the above exemplary embodiments. Descriptions in the exemplary embodiments and the specification are for purposes of illustration. Modifications and variations may be implanted without departing the spirit and scope of the present disclosure. The true scope of the present disclosure is indicated by the following claims and their equivalents.

What is claimed is:

1. A novel environmental wood laminate flooring, comprising:
   a base board layer; and
   a stacked structure adhered to a top surface of the base board layer,
      wherein the stacked structure comprises a wear-resistant layer, a translucent wood veneer layer and a layer of glue-soaked paper which are stacked successively from top to bottom, and wherein the layer of glue-soaked paper is dip-dyed with different shades of colors;
      wherein the wear-resistant layer comprises a first wear-resistant layer and a second wear-resistant layer which are stacked successively from top to bottom, and
      wherein the second wear-resistant layer is dyed with different shades of colors and is different from the first wear-resistant layer.

2. The flooring according to claim 1, wherein the layer of glue-soaked paper is dip-dyed into yellow or light green.

3. The flooring according to claim 1, wherein the layer of glue-soaked paper includes raw paper and glue, the raw paper of the layer of glue-soaked paper has a basis weight of 90 g and in the layer of glue-socked paper, a weight of the glue is 50% to 130% of the raw paper's weight.

4. The flooring according to claim 1, wherein a composition of the first wear-resistant layer is same with or different from that of the second wear-resistant layer.

5. The flooring according to claim 1, wherein the first wear-resistant layer includes raw paper and resin, the raw paper in the first wear-resistant layer has a basis weight of 33 g and in the first wear-resistant layer, a weight of the resin is equal to or greater than 170% of the raw paper's weight; and
   wherein the second wear-resistant layer includes raw paper and resin, the raw paper in the second wear-resistant layer has a basis weight of 33 g and in the second wear-resistant layer, a weight of the resin is equal to or greater than 170% of the raw paper's weight.

6. The flooring according to claim 1, wherein the first wear-resistant layer includes raw paper and resin, the raw paper in the first wear-resistant layer has a basis weight of 40 g and in the first wear-resistant layer, a weight of the resin is equal to or greater than 170% of the raw paper's weight; and
   wherein the second wear-resistant layer includes raw paper and resin, the raw paper in the second wear-resistant layer has a basis weight of 20 g and in the second wear-resistant layer, a weight of the resin is equal to or greater than 170% of the raw paper's weight.

7. The flooring according to claim 1, wherein the wear-resistant layer includes a layer of wear-resistant paper which is dyed with different shades of colors.

8. The flooring according to claim 1, wherein the base board layer is a high-density board.

9. The flooring according to claim 8, wherein the high-density board has a density ranging from 0.8 g/cm³ to 0.85 g/cm³.

10. The flooring according to claim 1, wherein the base board layer has a thickness ranging from 6 mm to 20 mm.

11. The flooring according to claim 1, further comprising a balancing layer adhered to a bottom surface of the base board layer.

12. The flooring according to claim 1, further comprising tongues and grooves, wherein the tongues and grooves are configured on four lateral faces of the flooring, whereby a plurality of the floorings can be attached together via the tongues and grooves.

13. The flooring according to claim 1, wherein the wear-resistant layer comprises Al2O3.

14. The flooring according to claim 1, wherein the wear-resistant layer comprises wear-resistant agent.

15. The flooring according to claim 11, wherein the balancing layer comprises raw paper and resin, the raw paper in the balancing layer has a basis weight of 120 g, and a weight of the resin in the balancing layer is equal to or greater than 110% of the raw paper's weight.

* * * * *